No. 791,294. PATENTED MAY 30, 1905.
A. F. SCHULTZ.
MANIFOLD PAD LEDGER.
APPLICATION FILED NOV. 12, 1903.
2 SHEETS—SHEET 1.
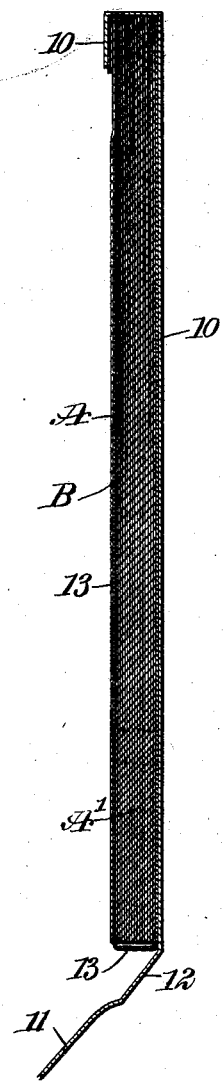
WITNESSES:
INVENTOR
Albert F. Schultz
BY
ATTORNEYS No. 791,294. PATENTED MAY 30, 1905.
A. F. SCHULTZ.
MANIFOLD PAD LEDGER.
APPLICATION FILED NOV. 12, 1903.
2 SHEETS—SHEET 2.
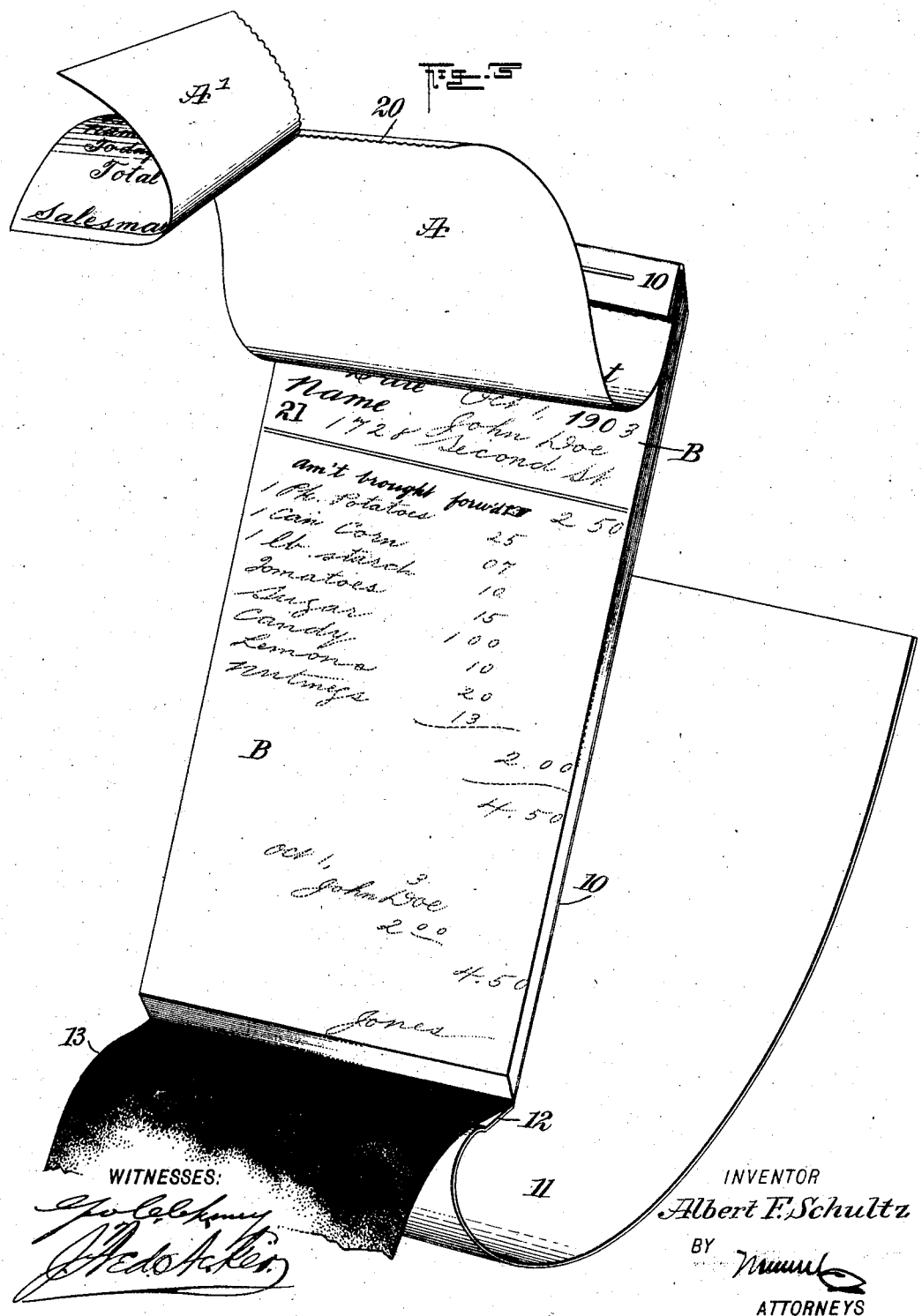
WITNESSES:
INVENTOR
Albert F. Schultz
BY
ATTORNEYS No. 791,294. Patented May 30, 1905.

UNITED STATES PATENT OFFICE.

ALBERT F. SCHULTZ, OF DANVILLE, ILLINOIS.

MANIFOLD PAD-LEDGER.

SPECIFICATION forming part of Letters Patent No. 791,294, dated May 30, 1905.

Application filed November 12, 1903. Serial No. 180,871.

*To all whom it may concern:*

Be it known that I, ALBERT F. SCHULTZ, a citizen of the United States, and a resident of Danville, in the county of Vermilion and State of Illinois, have invented a new and Improved Manifold Pad-Ledger, of which the following is a full, clear, and exact description.

The purpose of the invention is to provide a form of pad which will in ordinary commercial transactions serve as a ledger, the construction of the pad being such that with the assistance of an attached carbon-sheet a complete entry of articles purchased when entered upon a pad will be transferred to an underlying sheet, which latter is given to the purchaser, the original order or entry sheet remaining upon the pad, so that when a credit customer purchases a second time the sheets on the pad or pads may be quickly looked over and the amount of the unpaid charge immediately ascertained without reference to the regular ledger and such amount added to the last entry or order sheet, so that at each transaction a credit customer will have a record of the amount owed previous to the last order and the total amount due at the date of issue of the last duplicate order or entry sheet, and at the same time the merchant will have a similar entry on the pad to be referred to when the next credit transaction by the same party is made.

Another purpose of the invention is to provide a slip for the original entry or order sheet or the order or entry sheet which remains a portion of the pad, the said slip having a line for date, a place for the name of the purchaser, a space for the actual sale as indicated by the order-sheet to which the slip is attached and also a space for the total charge against the customer at the date mentioned on the slip, which corresponds to that on the entry or order sheet, and a space to enter a cash transaction, together with a space in which the salesman's name is to be entered. Thus while the full transaction and the previous amount due remain on the order or entry sheet in the pad when the slip attached to that pad is detached therefrom the bookkeeper is enabled to quickly make the suitable entries in the regular set of books and can quickly refer to any particular original entry or order sheet.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a plan view of the improved ledger-pad, an original entry or order sheet being uppermost. Fig. 2 is a vertical section through the pad shown in Fig. 1; and Fig. 3 is a perspective view of the pad shown in Fig. 1, an original or entry sheet being raised to show the duplicate order or entry sheet which is adapted to be given to the customer, the backing and the carbon-paper employed being folded away from the body of the pad.

The pad consists of a back 10, a cover 11, preferably secured to the bottom portion of the back, which cover has a depression 12 where it extends over the lower edge of the pad as the cover is placed in covering position, and a carbon or transfer sheet 13, which is secured to the back where it connects with the cover.

The body of the pad consists of series of original entry or order sheets A and duplicate order or entry sheets B, a duplicate sheet B being located beneath each original order or entry sheet A, and when the pad is in use the transfer or carbon paper 13 is placed between an original order or entry sheet A and the duplicate sheet B on which the articles and figures on the original order-sheet are to be duplicated. The original order or entry sheets A remain secured to the back of the pad; but the duplicate order or entry sheets B are adapted to be torn from the pad and to be handed to the buyer.

Each original order or entry sheet A is provided with a column 14, ruled to receive an entry of the articles purchased, and amount-columns 15 and 16, together with an upper space 17, in which is usually printed the words "Amount brought forward." A panel 18 is provided at the upper portion of each original entry or order sheet A, on which the name and address of the merchant are produced, and below this panel 18 a second panel 19 is ruled off, provided with a line headed "Date," another line headed "Name," and usually one or more extra lines for the address of the purchaser. At the bottom of each original entry or order sheet A a slip A' is located, separated from the main body of the sheet by a perforated or score line 20, so that the slip A' may be readily detached from the body of the sheet A. This slip is provided with a line headed "Date," a line headed "Name," a line headed, for example, "To-day's sales," a line headed "Total charge," a line headed "Cash," and a space headed "Salesman."

Each duplicate entry or order sheet B is provided with an upper panel 21, bearing the name and address of the merchant, and a line headed "Date," a line headed "Name," and one or more lines for an address. In fact, the panel 21 is a duplicate of the panels 18 and 19 at the upper portion of the original order or entry sheet. Below the panel 21 the words "Amount brought forward" are produced.

In operation the transfer or carbon sheet 13 is placed between the original order or entry sheet and a corresponding duplicate sheet B, and consequently when the name and address of the buyer and the articles and the amount to be paid have been set down on the original order or entry sheet they are duplicated on the duplicate sheet B. If the customer is a credit customer, the salesman will look back through one or more pads covering a certain period of time and will ascertain from the last charge to the same customer the amount then due the merchant. This amount is then placed in the column 16 opposite the words "Amount brought forward." The amounts of the several individual items just sold are then added, and the total is placed also in the column 16. This total is added to the amount brought forward, and the grand total is likewise set down in the said column 16. All of these entries are duplicated through the medium of the transfer or carbon sheet 13 on the duplicate sheet B of the pad, and if any cash transaction is made the same is credited on the original order or entry sheet A, consequently appearing on the duplicate sheet B, and the balance is struck in the usual way. The slip A' is then filled out—namely, the date, for example, October 1, 1903, the name "John Doe," and under the heading "To-day's sales" the amount of the purchase made, (namely, "$2.00," as is shown in Fig. 1,) and then under the heading "Total charge" the total amount due at that time is entered. Under the heading "Cash" any cash that may have been paid is entered, and finally the salesman signs the slip opposite the term "Salesman." The duplicate sheet B is then torn out from the pad and is handed to the customer, and the customer will thus have before him the exact amount of the purchase just made and likewise the total amount due the merchant. The slip is then torn off and filed away, enabling the bookkeeper to verify the sales and make the suitable entries in the regular set of books; but the original entry or order sheets remain attached to the back of the pad, so that when the customer calls again to make another purchase the amount due from the customer can be quickly ascertained and entered upon the new order, so that if the customer loses an old bill or memorandum the last one received gives the customer the exact condition of his account.

In order that a salesman shall not easily make a mistake by removing an original entry-sheet instead of a duplicate entry-sheet, the two sheets are preferably distinguished by different colors.

Having thus described my invention, I claim as new and desire to secure by Letters Patent—

A pad-ledger, consisting of a series of bound original, and duplicate sheets alternately arranged, a back secured to the pad at its upper end, an integral cover extending from the lower end of the back and adapted to fold upwardly over the free ends of the sheets to cover the front side of the ledger, said cover having creases at the points where it turns the corners of the free end of the ledger, a carbon or transfer sheet secured to the back where it connects with the cover and extending toward the free end of the cover, the original sheets each having ruled lines forming a column for articles and two columns for amounts and provided at its lower free end with a separable summary transaction-slip connected therewith by a weakened portion, the original and duplicate sheets being provided at their upper ends with designated spaces for the names of the parties to a transaction, and having immediately underneath said spaces the words "Amount brought forward" produced thereon, the remaining portion of said duplicate sheets being plain, as shown and described.

In testimony whereof I have signed my name to this specification in the presence of two subscribing witnesses.

ALBERT F. SCHULTZ.

Witnesses:
FRANK L. DAVIES,
JOHN H. LOWMAN.